US012743291B2

(12) United States Patent
Chen

(10) Patent No.: US 12,743,291 B2
(45) Date of Patent: Sep. 22, 2026

(54) METHOD FOR DISPLAYING IMAGE OBJECTS ON A SCREEN, USING AN INFERENCE MODEL IN A HYBRID OPERATING SYSTEM

(71) Applicant: Acer Incorporated, New Taipei City (TW)

(72) Inventor: Kuan-Ju Chen, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 324 days.

(21) Appl. No.: 18/643,679

(22) Filed: Apr. 23, 2024

(65) Prior Publication Data

US 2024/0385857 A1 Nov. 21, 2024

(30) Foreign Application Priority Data

May 19, 2023 (TW) ................................ 112118641

(51) Int. Cl.
*G06F 3/0481* (2022.01)
*G06F 9/451* (2018.01)

(52) U.S. Cl.
CPC ............ *G06F 9/451* (2018.02); *G06F 3/0481* (2013.01)

(58) Field of Classification Search
CPC ............................... G06F 9/451; G06F 3/0481
See application file for complete search history.

(56) References Cited

U.S. PATENT DOCUMENTS 7,750,912 B2 7/2010 Polzin et al.
9,360,991 B2 6/2016 Celebisoy
2009/0077297 A1 3/2009 Zhao et al.
2016/0284105 A1* 9/2016 Dawood .............. H04N 19/137
2022/0229764 A1* 7/2022 Zhai ...................... G06F 18/214
2022/0405552 A1 12/2022 Lichtenau et al.
2023/0131682 A1* 4/2023 Singh ...................... G06F 9/451 382/100

(Continued)

FOREIGN PATENT DOCUMENTS

TW 200745875 A 12/2007
TW 200912755 A 3/2009

(Continued)

OTHER PUBLICATIONS

Chinese language office action dated Jun. 28, 2024, issued in application No. TW 112118641.

(Continued)

*Primary Examiner* — Rinna Yi

(74) *Attorney, Agent, or Firm* — McClure, Qualey & Rodack, LLP

(57) ABSTRACT

A method for displaying image objects is provided. The method is used in a device. The method includes starting a second operating system when executing a first operating system. The method includes determining whether an image object in a buffer comes from a window composition manager of the second operating system. The method includes determining whether an image content of the image object is consistent with the window composition manager when the image object comes from the window composition manager of the second operating system. The method includes setting the image object to be hidden when the image object is not consistent with the window composition manager.

8 Claims, 6 Drawing Sheets

(56) References Cited

U.S. PATENT DOCUMENTS

2024/0134703 A1* 4/2024 Kelly ...................... G06F 9/505

FOREIGN PATENT DOCUMENTS

| | | | |
|---|---|---|---|
| TW | 201246053 | A | 11/2012 |
| TW | 202143167 | A | 11/2021 |
| TW | 202248909 | A | 12/2022 |
| TW | 202303390 | A | 1/2023 |
| TW | 202303420 | A | 1/2023 |

OTHER PUBLICATIONS

Chinese language office action dated Dec. 26, 2023, issued in application No. TW 112118641.

* cited by examiner

METHOD FOR DISPLAYING IMAGE OBJECTS ON A SCREEN, USING AN INFERENCE MODEL IN A HYBRID OPERATING SYSTEM

CROSS REFERENCE TO RELATED APPLICATIONS

This application claims priority from Taiwan Patent Application No. 112118641, filed on May 19, 2023, the disclosure of which is incorporated herein in its entirety by reference.

BACKGROUND OF THE APPLICATION

Field of the Application

The present disclosure generally relates to a method and a device for displaying image objects. More specifically, aspects of the present disclosure relate to a method and a device for displaying image objects when different operating systems are running simultaneously.

Description of the Related Art

A hybrid operating system (Hybrid OS) refers to sharing a system core, system settings and drivers, and running two or more different operating systems on the same electronic device at the same time.

Starting from Windows 11, the taskbar will not be allowed to be hidden by users. Since the taskbar 100 cannot be set to be hidden (as shown in FIG. 1) when a user runs a hybrid operating system, the user will not be able to get a complete user experience when running an operating system other than Windows 11.

Therefore, there is a need for a method and device for displaying image objects, which can be consistent with the user's existing impression when two different operating systems are running and can improve the difference in perception and impression during use.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for displaying image objects.

In an exemplary embodiment, a method for displaying image objects is provided. The method is used in a device. The method includes starting a second operating system when executing a first operating system. The method includes determining whether an image object in a buffer comes from a window composition manager of the second operating system. The method includes determining whether an image content of the image object is consistent with the window composition manager when the image object comes from the window composition manager of the second operating system. The method includes setting the image object to be hidden when the image object is not consistent with the window composition manager.

In some embodiments, the method further comprises displaying the image object when the image content is consistent with the window composition manager.

In some embodiments, the image content at least includes pixels, ARGB (Alpha, Red, Green, Blue) values and an application programming interface (API).

In some embodiments, before starting the second operating system, the method further comprises: training an inference model; and inputting a CPU model, a memory capacity, and a desktop menu of the device into the inference model to obtain the window composition manager.

In some embodiments, the inference model is based on a convolutional neural network (CNN) model or a deep neural network (DNN) model.

In an exemplary embodiment, a device for displaying image objects is provided. The device comprises one or more processors and one or more computer storage media for storing one or more computer-readable instructions. The processor is configured to drive the computer storage media to execute the following tasks. The processor starts a second operating system when executing a first operating system. The processor determines whether an image object in a buffer comes from a window composition manager of the second operating system. The processor determines whether an image content of the image object is consistent with the window composition manager when the image object comes from the window composition manager of the second operating system. The processor sets the image object to be hidden when the image object is not consistent with the window composition manager.

BRIEF DESCRIPTION OF DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure.

Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The embodiments of the present disclosure provide a method and device for displaying image objects, so as to maintain the same experience as the native operating system when different operating systems are executed on the same electronic device.

Figure 1:
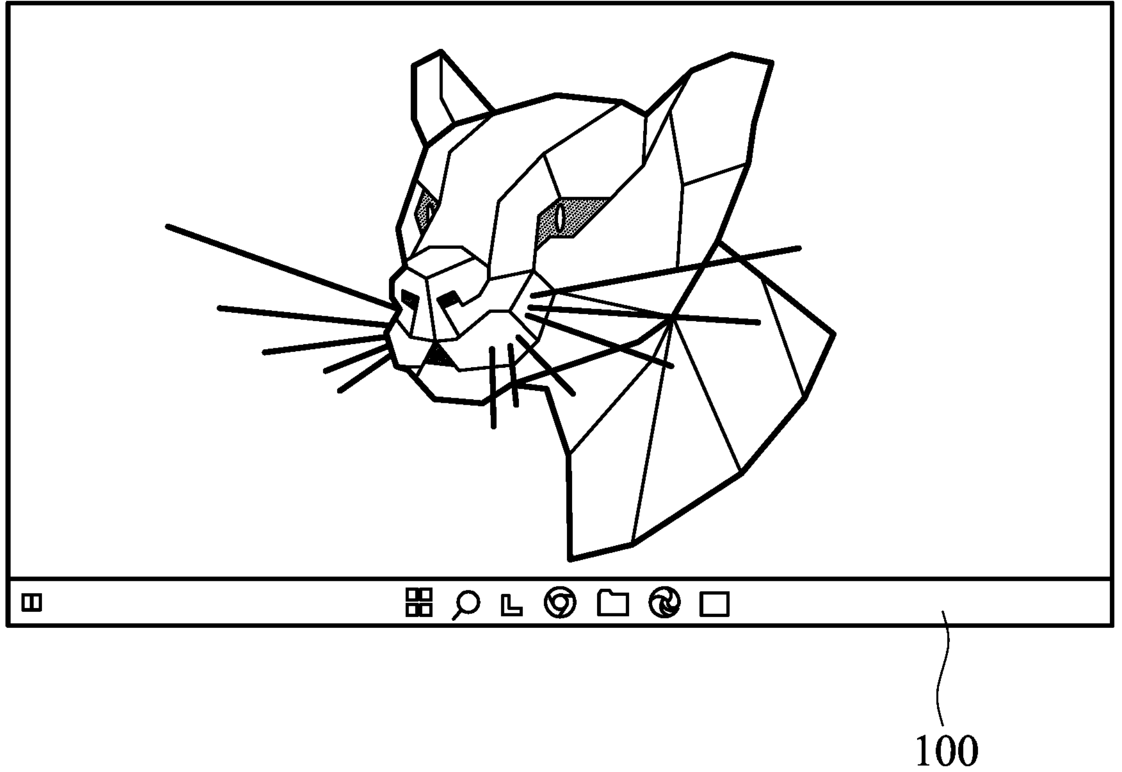
FIG. 1 is a schematic diagram showing that the taskbar cannot be hidden in the operating system.
Figure 2:
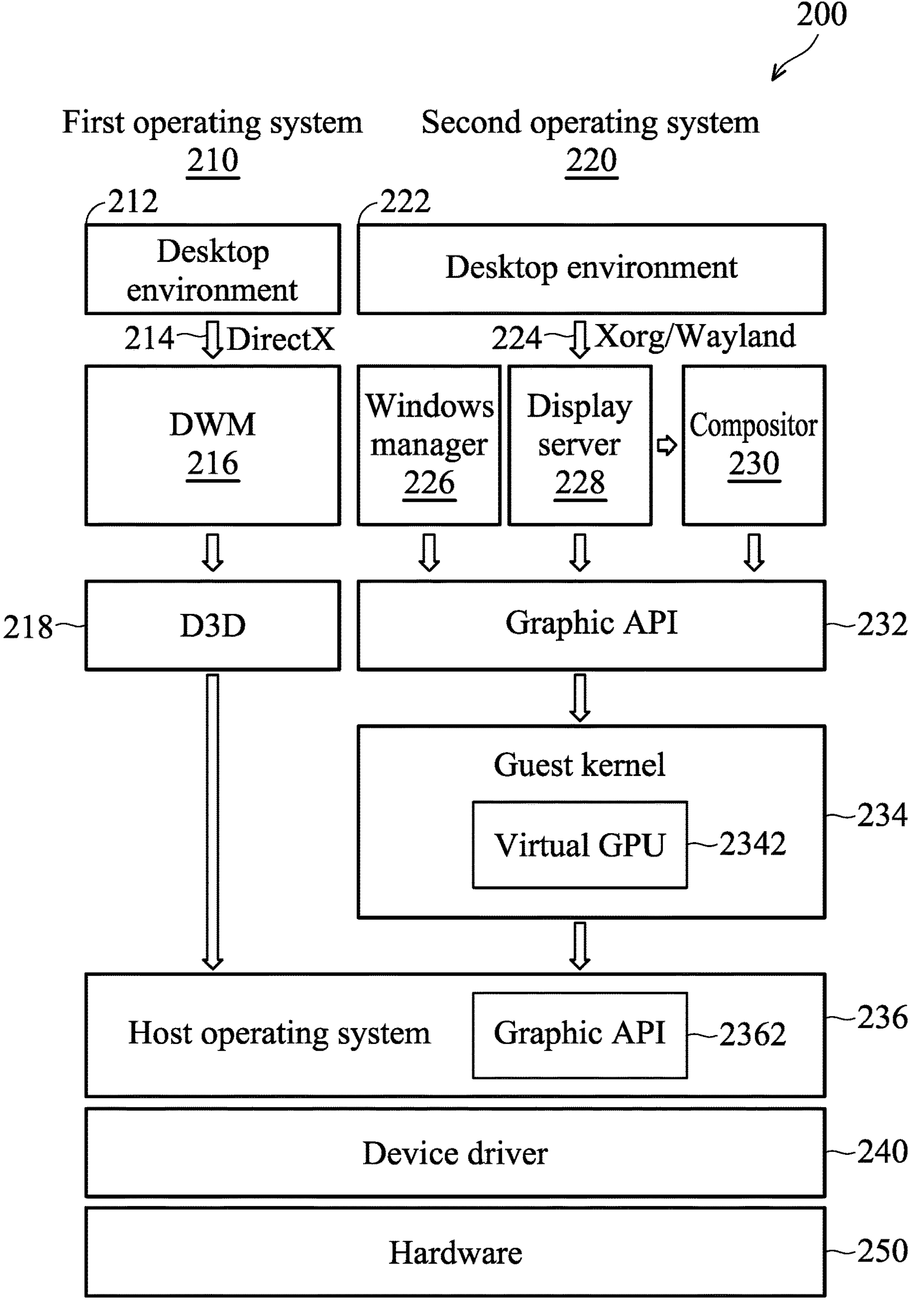
FIG. 2 is a schematic diagram illustrating an architecture of the hybrid operating system for image objects and display parts according to an embodiment of the present disclosure.

FIG. 2 is a schematic diagram illustrating an architecture of the hybrid operating system 200 for image objects and display parts according to an embodiment of the present disclosure. The hybrid operating system 200 runs in an electronic device and comprises a first operating system 210 and a second operating system 220.

The first operating system 210 is the main operating system of the electronic device. In this embodiment, the first operating system 210 is a Windows operating system. In the Windows operating system, the desktop environment 212 is the Windows desktop. The window composition manager is a Desktop Window Manager (DWM) 216. The display-related Application Programming Interface (API) is DirectX 214, and the graphics-related API is Direct3D (D3D) 218.

The second operating system 220 is a completely different operating system from the first operating system 210. In this embodiment, the second operating system 220 is a Linux operating system. In the Linux operating system, the top layer is the desktop environment 222, and the display-related application programming interface is Xorg or Wayland 224. The window composition manager may comprise a Windows manager 226, a display server 228, and a compositor 230. The next architecture is the graphic application programming interface (API) 232 and the virtual graphics processing unit (GPU) 2342 in the guest kernel 234.

The subsequent architectural layers are the host operating system (Host OS) 236, the device driver 240 and the hardware 250. The virtual graphics processing unit 234 accesses the graphic API 2362 in the host operating system 236. The device driver 240 and the hardware 250 may be used by the first operating system 210 and the first operating system 220.

In order to maintain the same user experience as the native second operating system 220 (for example, the location and coordinates of the start menu and the control panel must be consistent with the second operating system 220), the Windows manager 226 in the second operating system 220 must be deployed. Since the deployment of the second operating system 220 is based on the first operating system 210, there must be a mapping relationship between the graphic API 232 of the second operating system 220 and the D3D 218 of the first operating system 210, so that signal transmission and application program interface mapping may be supported.

Figure 6:
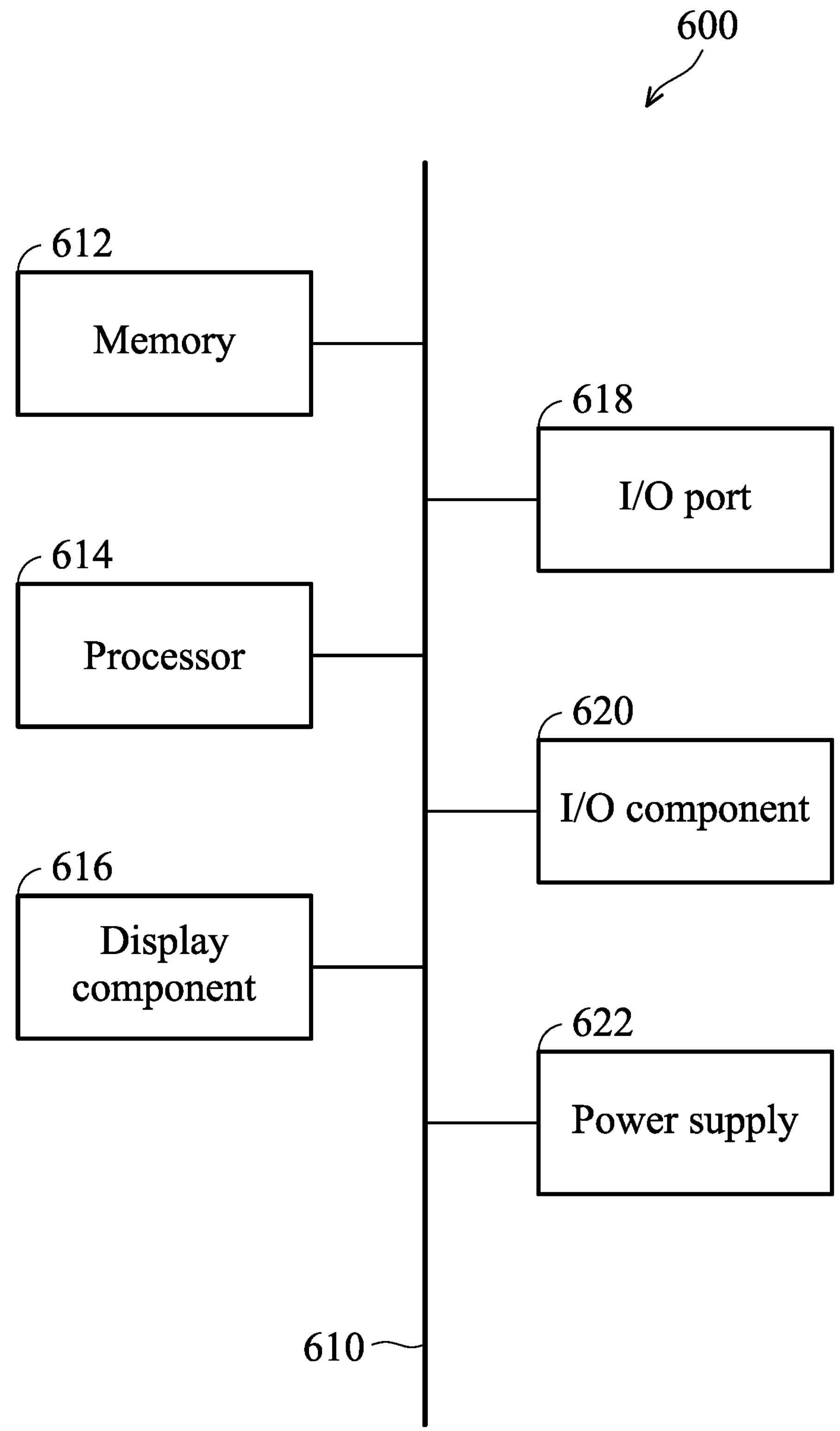
FIG. 6 illustrates an exemplary operating environment for implementing embodiments of the present disclosure.

It should be understood that the electronic device running the hybrid operating system 200 shown in FIG. 2 can be implemented via any type of computing device, such as the electronic device 600 described with reference to FIG. 6, as shown in FIG. 6.

Figure 3:
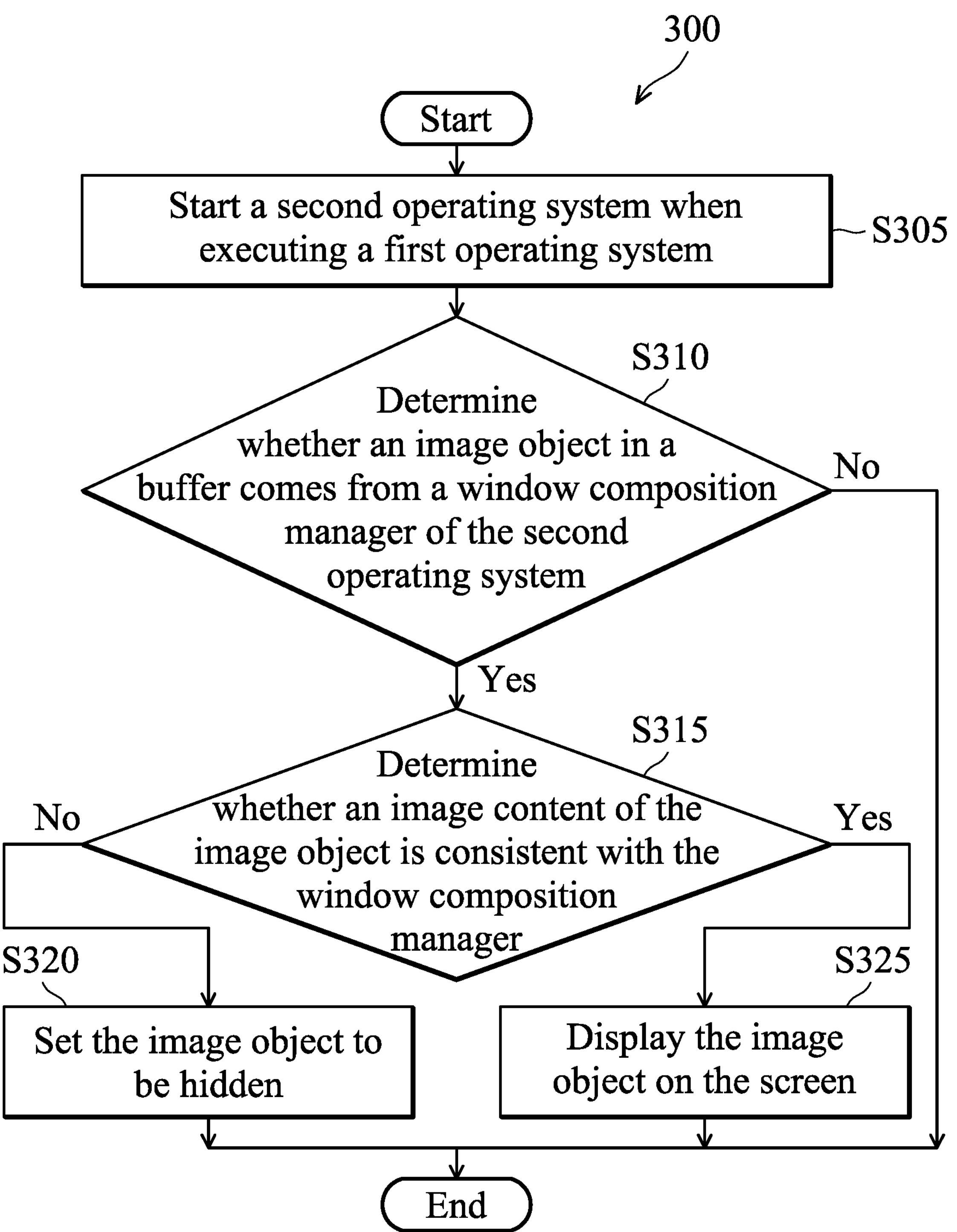
FIG. 3 is a flowchart showing a method for displaying image objects according to an embodiment of the present disclosure.

FIG. 3 is a flowchart showing a method 300 for displaying image objects according to an embodiment of the present disclosure. This method may be executed by an electronic device running the hybrid operating system 200 as shown in FIG. 2.

In step S305, the electronic device starts a second operating system when executing a first operating system. Specifically, taking the architecture of the second operating system as the Linux operating system in FIG. 2 as an example, after starting the second operating system, a virtual desktop is generated, and the compositor of the second operating system is displayed in the virtual desktop in full-screen mode. Therefore, after the second operating system is started, the user can still maintain the complete experience of using the first operating system.

In step S310, the electronic device determines whether an image object in a buffer comes from a window composition manager of the second operating system, wherein the image object in the buffer is an image object that is about to be displayed on the screen. In other words, the electronic device confirms whether the image object complies with the image composition mechanism of the window composition manager.

When the image object is not from the window composition manager of the second operating system ("No" in step S310), the process ends. In other words, the electronic device may not perform the action of starting the second operating system.

When the image object comes from the window composition manager of the second operating system ("Yes" in step S310), in step S315, the electronic device determines whether an image content of the image object is consistent with the window composition manager, wherein the image content at least comprises: pixels, ARGB (Alpha, Red, Green, Blue) values and an application programming interface (API).

When the image content is not consistent with the window composition manager ("No" in step S315), in step S320, the electronic device sets the image object to be hidden. Specifically, the image content that is not consistent with the window composition manager means that the image objects that do not match the window composition manager may be displayed on the screen. To prevent the image objects that do not match the window composition manager from being displayed on the screen, the image objects that do not match the window composition manager need to be set to hidden.

In one embodiment, the electronic device can be set to be hidden by setting the display coordinate of the image object to a negative value.

When the image content is consistent with the window composition manager ("Yes" in step S315), in step S325, the electronic device displays the image object on the screen. Specifically, taking the architecture in FIG. 2 as an example, when the second operating system is a Linux operating system, the graphical user interface (GUI) of the Linux operating system, such as a desktop environment or a built-in application, is displayed on the compositor. In another example, when the second operating system is a Windows operating system, the desktop environment or built-in applications of the Windows operating system is displayed on the desktop window manager.

Figure 4:
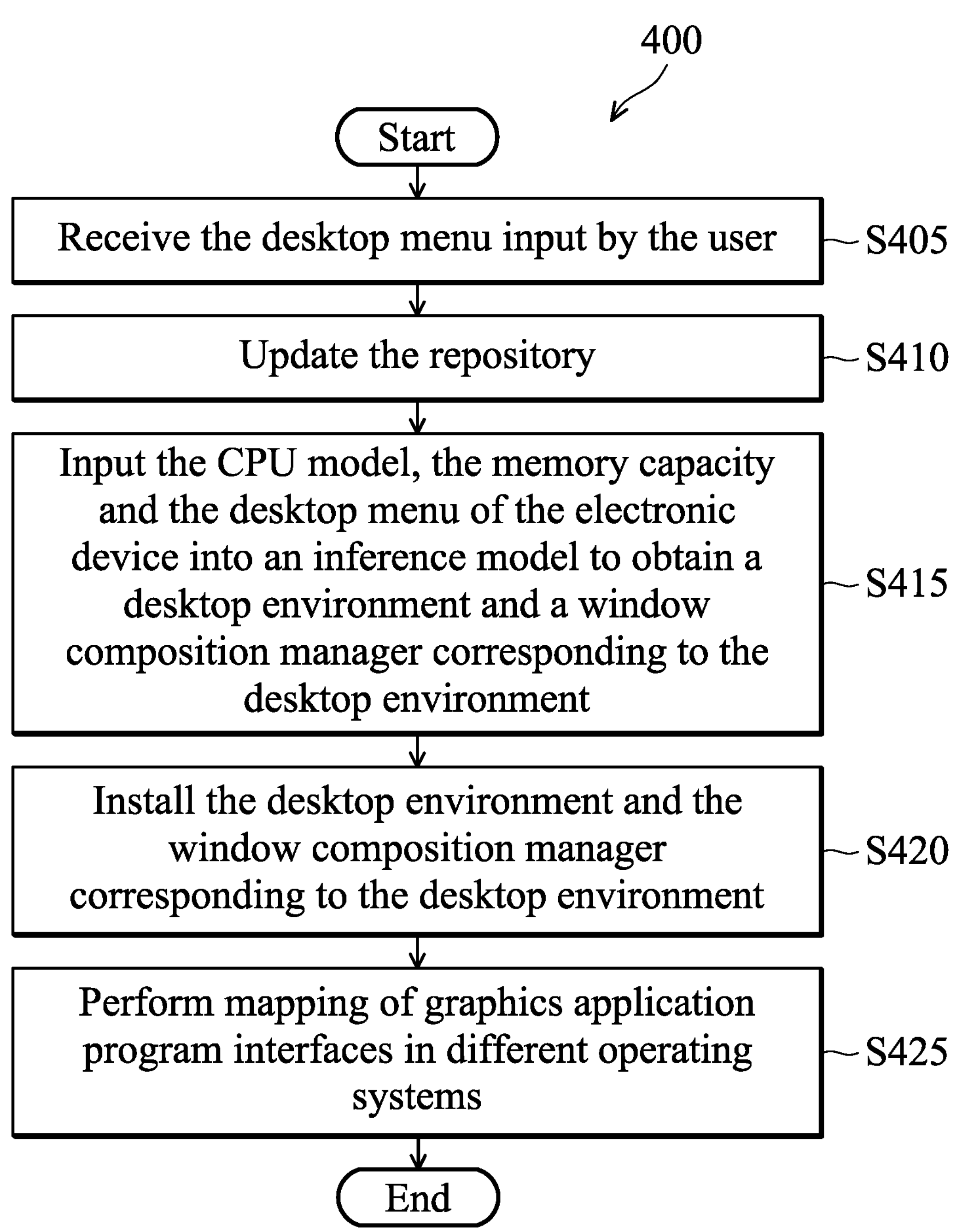
FIG. 4 is a flowchart showing a method for smart deployment of a hybrid operating system according to an embodiment of the present disclosure.

FIG. 4 is a flowchart 400 showing a method for smart deployment of a hybrid operating system according to an embodiment of the present disclosure, wherein this method can be performed by an electronic device running the hybrid operating system 200 in FIG. 2. The method is completed before starting the second operating system in FIG. 3. The main task is for the user to deploy a distribution version of the electronic device suitable for use, and to infer a window management mechanism corresponding to the distribution version of the electronic device through an inference model.

Figure 5:
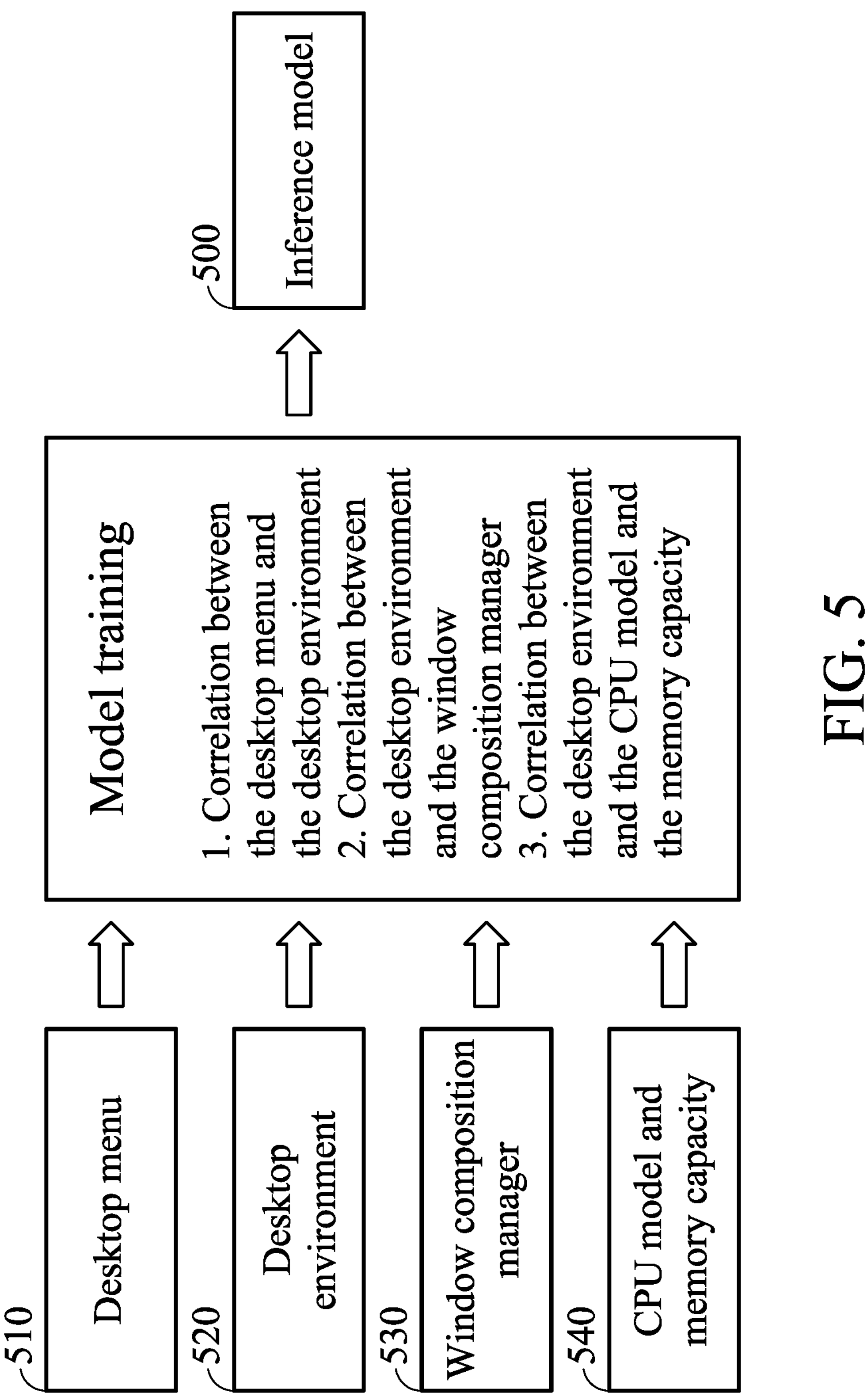
FIG. 5 is a schematic diagram showing a training inference model according to an embodiment of the present disclosure.

Before starting the process, the electronic device may first train an inference model. How the inference model is trained is illustrated in FIG. 5.

In step S405, the electronic device receives the desktop menu, for example, Ubuntu, Debian, Deepin, RedHat, etc., input by the user.

In step S410, the electronic device updates the repository to determine that the installed package software is the latest version and is suitable for the electronic device.

In step S415, the electronic device inputs the CPU model, the memory capacity and the desktop menu of the electronic device into an inference model to obtain a desktop environment and a window composition manager corresponding to the desktop environment, wherein the inference model is based on a convolutional neural network (CNN) model or a deep neural network (DNN) model.

In step S420, the electronic device installs the desktop environment and the window composition manager corresponding to the desktop environment. In one embodiment, when the operating system is a Linux operating system, the window composition manager comprises a window manager, a display server, and a compositor. The electronic device may install the desktop environment, a window manager, a display server and a compositor corresponding to the desktop environment.

In step S425, the electronic device performs mapping of graphics application program interfaces in different operating systems to achieve the effect of GPU acceleration.

FIG. 5 is a schematic diagram showing training an inference model 500 according to an embodiment of the present disclosure. The training inference model may be executed by the electronic device running the hybrid operating system 200 as shown in FIG. 2. The main purpose of training the inference model is to deploy a desktop environment for electronic devices suitable for users and maintain the same user experience as the native operating system.

Before training the inference model 500, the electronic device may first obtain training data. It should be noted that, the term "training", as used herein, is used to recognize an object used to train an inference model 500. Therefore, training data refers to data used to train the inference model.

The training data may at least comprise a desktop menu 510, a desktop environment 520, a window composition manager 530, a CPU model and a memory capacity 540. Therefore, the electronic device can train the inference model 500 for the correlation between the desktop menu and the desktop environment, the correlation between the desktop environment and the window composition manager, and the correlation between the desktop environment and the CPU model and the memory capacity.

The correlation between the desktop menu and the desktop environment: To maintain the same user experience as the native operating system, the desktop menu of each operating system has a corresponding desktop environment. For example, the electronic device may obtain the most commonly used or popular desktop environment of an operating system's desktop menu through relevant literature and market surveys. In another example, the mapping relationship between desktop menus and desktop environments can be obtained through relevant literature and market surveys. The mapping relationship is, for example, which desktop environment is most commonly used for the desktop menu in electronic devices with low computing power, or which desktop environment is most commonly used for the desktop menu in e-sports-specific electronic devices.

The correlation between the desktop environment and the window composition manager: Each desktop environment has a supported window composition manager. Among the supported window composition managers, the most commonly matched combinations can be obtained. For example: Steam OS uses KDE Plasma as its desktop environment, and the window composition manager most commonly used with Steam OS is Kwin-X11.

The correlation between the desktop environment and the CPU model and the memory capacity: In the Linux operating system, for example, there are many kinds of desktop environments. Some desktop environments are more modern and fancier, such as GNOME, and some desktop environments are relatively simple, such as LXDE. The former GNOME requires more CPU and memory capacity, while the latter LXDE is more suitable for low-profile electronic devices.

Therefore, the training data set used to train the inference model 500 at least comprises desktop menus, desktop environments, window composition managers, CPU models, memory capacities and other training data. The electronic device performs training on the correlation between the training data to train the inference model 500.

In one embodiment, the inference model 500 is based on a convolutional neural network (CNN) model or a deep neural network (DNN) model.

As mentioned above, the present disclosure proposes a method and device for displaying image objects, which can achieve consistency with the user's existing impression when the user runs two different operating systems, reduce the gap in perception and impression, and improve users' experiences in using hybrid operating systems.

Having described embodiments of the present disclosure, an exemplary operating environment in which embodiments of the present disclosure may be implemented is described below. Referring to FIG. 6, an exemplary operating environment for implementing embodiments of the present disclosure is shown and generally known as an electronic device 600. The electronic device 600 is merely an example of a suitable computing environment and is not intended to limit the scope of use or functionality of the disclosure. Neither should the electronic device 600 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 6, the electronic device 600 may include a bus 610 that is directly or indirectly coupled to the following devices: one or more memories 612, one or more processors 614, one or more display components 616, one or more input/output (I/O) ports 618, one or more input/output components 620, and an illustrative power supply 622. The bus 610 may represent one or more kinds of busses (such as an address bus, data bus, or any combination thereof). Although the various blocks of FIG. 6 are shown with lines for the sake of clarity, and in reality, the boundaries of the various components are not specific. For example, the display component such as a display device may be considered an I/O component and the processor may include a memory.

The electronic device 600 typically includes a variety of computer-readable media. The computer-readable media can be any available media that can be accessed by electronic device 600 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the electronic device 600. The computer storage media may not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 612 may include computer-storage media in the form of volatile and/or nonvolatile memory. The memory may be removable, non-removable, or a combination thereof. Exemplary hardware devices include solid-state memory, hard drives, optical-disc drives, etc. The electronic device 600 includes one or more processors that read data from various entities such as the memory 612 or the I/O components 620. The display component(s) 616 present data indications to a user or to another device. Exemplary presentation components include a display device, speaker, printing component, vibrating component, etc.

The I/O ports 618 allow the electronic device 600 to be logically coupled to other devices including the I/O components 620, some of which may be embedded. Illustrative components include a microphone, joystick, game pad, satellite dish, scanner, printer, wireless device, etc. The I/O components 620 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the electronic device 600, or any combination thereof. The electronic device 600 may be equipped with depth cameras, such as stereoscopic camera systems, infrared camera systems, RGB camera systems, or any combination thereof, to realize gesture detection and recognition. Furthermore, the electronic device 600 may be equipped with accelerometers or gyroscopes that enable detection of motion. The output of the accelerometers or gyroscopes may be provided to the display of the electronic device 600 to carry out immersive augmented reality or virtual reality.

Furthermore, the processor 614 in the electronic device 600 can execute the program code in the memory 612 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for displaying image objects on a screen, used in a device, comprising:

starting a second operating system when executing a first operating system;

determining whether an image object in a buffer comes from a window composition manager of the second operating system;

determining whether an image content of the image object is consistent with the window composition manager when the image object comes from the window composition manager of the second operating system; and setting the image object to be hidden from the screen when the image object is not consistent with the window composition manager, wherein before starting the second operating system, the method further comprises:

training an inference model; and inputting a CPU model, a memory capacity, and a desktop menu of the device into the inference model to obtain the window composition manager.

2. The method for displaying image objects as claimed in claim 1, further comprising:

displaying the image object when the image content is consistent with the window composition manager.

3. The method for displaying image objects as claimed in claim 1, wherein the image content at least includes: pixels, ARGB (Alpha, Red, Green, Blue) values and an application programming interface (API).

4. The method for displaying image objects as claimed in claim 1, wherein the inference model is based on a convolutional neural network (CNN) model or a deep neural network (DNN) model.

5. A device for displaying image objects on a screen of the device, comprising:

one or more processors; and one or more computer storage media for storing one or more computer-readable instructions, wherein the processor is configured to drive the computer storage media to execute the following tasks:

starting a second operating system when executing a first operating system;

determining whether an image object in a buffer comes from a window composition manager of the second operating system;

determining whether an image content of the image object is consistent with the window composition manager when the image object comes from the window composition manager of the second operating system; and setting the image object to be hidden from the screen when the image object is not consistent with the window composition manager, wherein before starting the second operating system, the processor further executes the following tasks:

training an inference model; and inputting a CPU model, a memory capacity, and a desktop menu of the device into the inference model to obtain the window composition manager.

6. The device for displaying image objects as claimed in claim 5, wherein the processor further executes the following tasks:

displaying the image object when the image content is consistent with the window composition manager.

7. The device for displaying image objects as claimed in claim 5, wherein the image content at least includes: pixels, ARGB (Alpha, Red, Green, Blue) values and an application programming interface (API).

8. The device for displaying image objects as claimed in claim 5, wherein the inference model is based on a convolutional neural network (CNN) model or a deep neural network (DNN) model.

* * * * *